US009096118B2

(12) United States Patent
Hori et al.

(10) Patent No.: US 9,096,118 B2
(45) Date of Patent: Aug. 4, 2015

(54) DRIVE DEVICE FOR HYBRID VEHICLE (75) Inventors: Tetsuo Hori, Toyota (JP); Hiroatsu Endo, Nagoya (JP); Kenji Miyasaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/375,345

(22) PCT Filed: Feb. 28, 2012

(86) PCT No.: PCT/JP2012/055003
§ 371 (c)(1),
(2), (4) Date: Jul. 29, 2014

(87) PCT Pub. No.: WO2013/128586
PCT Pub. Date: Sep. 6, 2013

(65) Prior Publication Data
US 2015/0024902 A1  Jan. 22, 2015

(51) Int. Cl.
*F16H 3/72* (2006.01)
*B60K 6/42* (2007.10)
*B60K 6/445* (2007.10)
*B60K 6/405* (2007.10)
*B60W 20/00* (2006.01)

(52) U.S. Cl.
CPC . *B60K 6/42* (2013.01); *B60K 6/405* (2013.01); *B60K 6/445* (2013.01); *B60W 20/40* (2013.01); *B60Y 2306/09* (2013.01); *Y02T 10/6239* (2013.01); *Y10S 903/952* (2013.01)

(58) Field of Classification Search
CPC .......... B60K 6/42; B60K 6/405; B60K 6/445; B60W 20/40; B60Y 2306/09

USPC .................... 475/5; 74/606 R, 607, 331, 330; 477/107, 97, 109, 5; 180/65.265
See application file for complete search history.

(56) References Cited

U.S. PATENT DOCUMENTS

| 5,875,691 | A  | * | 3/1999  | Hata et al. ........................ 74/661 |
| 5,967,940 | A  |   | 10/1999 | Yamaguchi |
| 8,225,688 | B2 | * | 7/2012  | Heinzelmann .................. 74/331 |
| 2006/0112778 | A1 | * | 6/2006  | Renner ........................... 74/339 |
| 2011/0212809 | A1 | * | 9/2011  | Tsutsui et al. ...................... 477/5 |
| 2012/0115677 | A1 | * | 5/2012  | Sakai et al. ....................... 477/5 |
| 2012/0309576 | A1 | * | 12/2012 | Kato ................................ 475/5 |

FOREIGN PATENT DOCUMENTS

| JP | A-11-93725 | 4/1999 |
| JP | A-2008-201351 | 9/2008 |
| WO | WO 2013/069098 A1 | 5/2013 |

* cited by examiner

*Primary Examiner* — David J Hlavka
(74) *Attorney, Agent, or Firm* — Oliff PLC (57) ABSTRACT

A drive device of a hybrid vehicle includes an engine and an electric motor acting as power sources, and further includes: a first rotating member coupled to the electric motor; a second rotating member to which power from the engine is transmitted; and a gear pair made up of helical gears formed on the first rotating member and the second rotating member to couple the first rotating member and the second rotating member in a power transmittable manner, within a case, an inner wall extending from an outer wall of the case toward an inside of the case is in the case, and an elastic member pressing the first rotating member toward the inner wall is provided in a preloaded state between the first rotating member and the inner wall.

6 Claims, 5 Drawing Sheets

DRIVE DEVICE FOR HYBRID VEHICLE

TECHNICAL FIELD

The present invention relates to a technique of reducing rattling noise in a drive device of a hybrid vehicle.

BACKGROUND ART

A drive device is conventionally well-known that can reduce rattling noise generated when gear members vibrate in a thrust direction and collide with a case because of rotational variation of helical gears disposed in a drive system of a hybrid vehicle and meshed with each other. For example, this corresponds to drive devices of hybrid vehicles of Patent Documents 1 and 2. In these drive devices, the reduction of the rattling noise is achieved by a control device controlling the drive device and the control device changes an operation point of an engine so as to reduce the rattling noise. For example, a control device of Patent Document 1 controls an engine rotation speed to a predetermined value or higher if a condition of occurrence of the rattling noise is detected in the vehicle power transmission device. When the engine is controlled in this way, the engine is prevented from being operated in a region with large torque variation and the rattling noise is reduced.

PRIOR ART DOCUMENTS

Patent Documents

Patent Document 1: Japanese Laid-Open Patent Publication No. 11-93725
Patent Document 2: Japanese Laid-Open Patent Publication No. 2008-201351

SUMMARY OF THE INVENTION

Problem to Be Solved by the Invention

In Patent Documents 1 and 2, as described above, the reduction of the rattling noise is achieved by the control provided by the control device. Since the rattling noise tends to occur in a hybrid vehicle when torque of an electric motor for running (electric motor torque) is zero or substantially zero, control of increasing a change rate of the electric motor torque is provided near the electric motor torque of zero in the process of change in the electric motor torque associated with positive/negative inversion so as to achieve the reduction of the rattling noise. Although the reduction of the rattling noise is achieved by the control of the engine or the electric motor in a conventional technique in this way, the engine or the electric motor is controlled with priority given to the reduction of the rattling noise and, therefore, this may lead to deterioration in fuel efficiency or drivability in exchange for the reduction in the rattling noise. Such a problem is unknown The present invention was conceived in view of the situations and it is therefore an object of the present invention to provide a drive device of a hybrid vehicle capable of reducing rattling noise in a drive system without leading to deterioration in fuel efficiency or drivability.

Means for Solving the Problem

To achieve the object, the first aspect of the invention provides (a) a drive device of a hybrid vehicle including an engine and an electric motor acting as power sources, and comprising: a first rotating member coupled to the electric motor; a second rotating member to which power from the engine is transmitted; and a gear pair made up of helical gears formed on the first rotating member and the second rotating member to couple the first rotating member and the second rotating member in a power transmittable manner, within a case, characterized in that (b) an inner wall extending from an outer wall of the case toward an inside of the case is formed in the case, and (c) an elastic member pressing the first rotating member toward the inner wall is provided in a preloaded state between the first rotating member and the inner wall.

Effects of the Invention

Consequently, when the torque of the electric motor becomes zero or close to zero, no torque may be transmitted to the first rotating member and the first rotating member may enter a floating state. In this case, when rotation variation due to explosion variation of the engine is transmitted to the first rotating member and causes the first rotating member to vibrate in the rotation direction and the thrust direction (axial direction), rattling occurs that is collision between the first rotating member and the case, and an impact force thereof vibrates a case surface and generates the noise, the so-called rattling noise. In this regard, since the elastic member presses the first rotating member toward the inner wall of the case in this configuration, the first rotating member can be allowed to collide with the inner wall side even when the rattling occurs. Therefore, because the impact force due to the rattling is not input to the outer wall side of the case, the rattling noise is reduced that is generated by the vibration of the outer wall surface of the case.

Preferably, the second aspect of the invention provides the drive device of a hybrid vehicle recited in the first aspect of the invention, wherein the gear pair is made up of a first gear formed on the first rotating member and a second gear formed on the second rotating member and meshed with the first gear, and wherein when the electric motor outputs a torque equal to or greater than a predetermined value set in advance, the first rotating member is biased toward the outer wall of the case by a thrust force acting on the first rotating member against a bias force of the elastic member. Consequently, the first rotating member is allowed to collide with the inner wall in the torque region of the electric motor in which rattling occurs in the first rotating member and, when a greater torque is transmitted by the electric motor, the gear reaction force in the thrust direction can be received by the outer wall, thereby allowing the inner wall and the outer wall of the case to receive support load of the first rotating member. Therefore, since support load applied toward the inner wall is reduced, deterioration in durability can be suppressed in the part supporting the first rotating member of the inner wall.

Preferably, the third aspect of the invention provides the drive device of a hybrid vehicle recited in the first or second aspect of the invention, wherein (a) the inner wall is a partition wall in the case separating a motor chamber housing the electric motor and a gear chamber housing the first rotating member and the second rotating member, wherein (b) the first rotating member is rotatably supported via an inner-wall bearing by the inner wall, wherein (c) an inner ring of the inner-wall bearing is press-fitted into the first rotating member, and wherein (d) an outer ring of the inner-wall bearing is pressed by the elastic member against a side wall formed on the inner wall. Consequently, since the outer ring of the inner-wall bearing is pressed by the elastic member against the side wall, the first rotating member is pressed against the inner wall via the inner-wall bearing.

Preferably, the fourth aspect of the invention provides the drive device of a hybrid vehicle recited in the third aspect of the invention, wherein a damping element suppressing resonance due to the elastic member is disposed between the inner wall and the inner-wall bearing. Consequently, although the resonance system is formed by disposing the elastic member, the damping element can suppress the vibration of the resonance system.

Preferably, the fifth aspect of the invention provides the drive device of a hybrid vehicle recited in any one of the first to third aspects of the invention, wherein (a) a rotor shaft of the electric motor and the first rotating member is coupled by spline fitting, and wherein (b) a damping element suppressing resonance due to the elastic member is disposed in a gap formed in a spline fitting portion between the rotor shaft of the electric motor and the first rotating member. Consequently, although the resonance system is formed by disposing the elastic member, the damping element can suppress the vibration of the resonance system.

Preferably, the sixth aspect of the invention provides the drive device of a hybrid vehicle recited in the third aspect of the invention, wherein the first rotating member is further rotatably supported via an outer-wall bearing by the outer wall of the case, and wherein a damping element suppressing resonance due to the elastic member is disposed between the outer wall and the outer-wall bearing. Consequently, although the resonance system is formed by disposing the elastic member, the damping element can suppress the vibration of the resonance system.

Preferably, the predetermined value of the torque of the electric motor is set to a threshold value of a torque region in which rattling is apt to occur in the first rotating member. Consequently, the rattling noise can be reduced by colliding the first rotating member with the inner wall in a torque region in which rattling occurs.

MODE FOR CARRYING OUT THE INVENTION

Preferably, an outer wall of the case corresponds to a part in contact with an exterior space of the case and an inner wall corresponds to a part not in contact with the exterior space of the case.

Preferably, a disk spring, rubber, etc. are used for the elastic member.

Preferably, friction material, resin, etc. are used for the damping element.

An example of the present invention will now be described in detail with reference to the drawings. In the following example, the figures are simplified or deformed as needed and portions are not necessarily precisely depicted in terms of dimension ratio, shape, etc.

FIRST EXAMPLE

Figure 1:
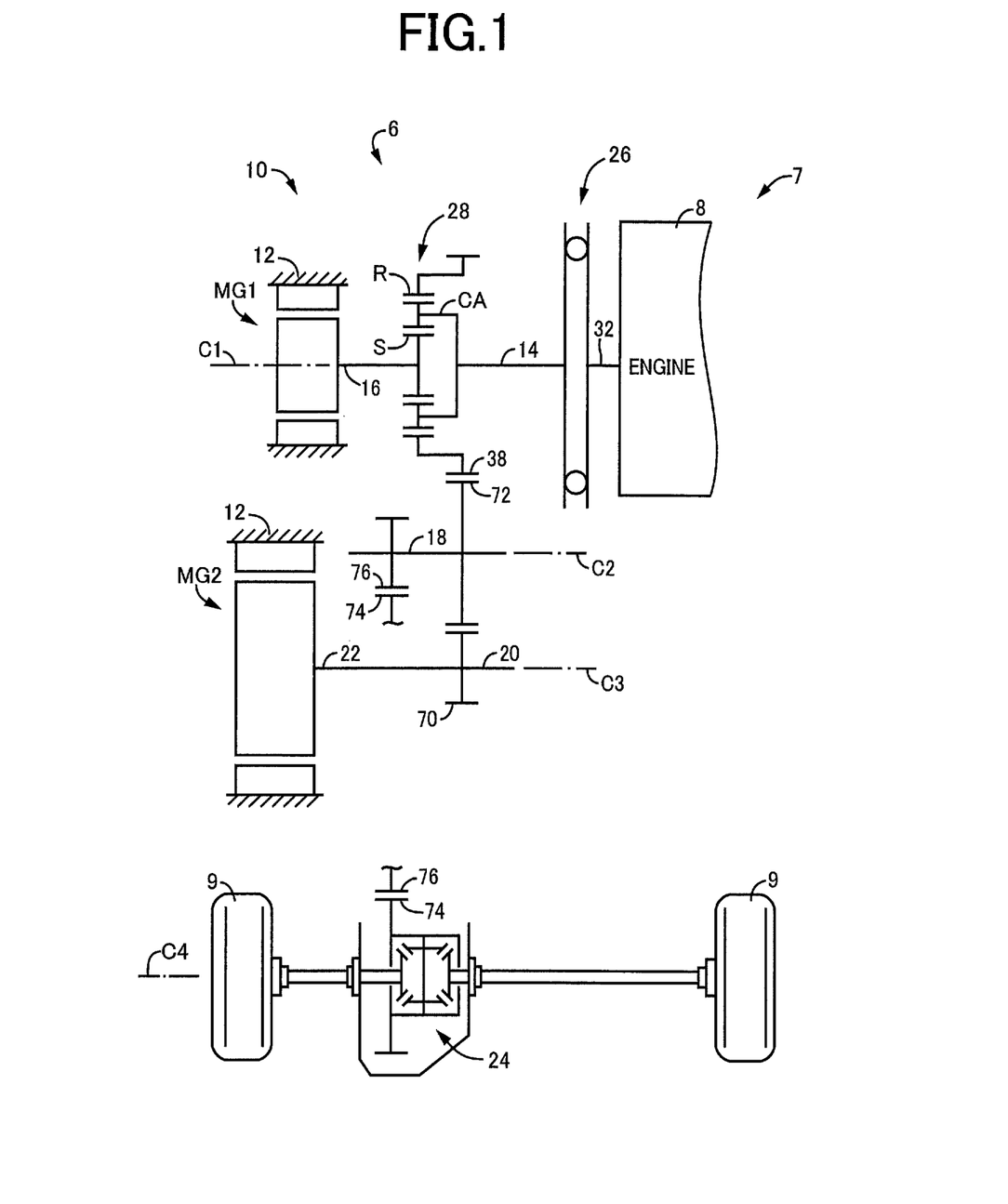
FIG. 1 is a skeleton diagram for explaining a structure of a hybrid vehicle to which the present invention is applied.
Figure 2:
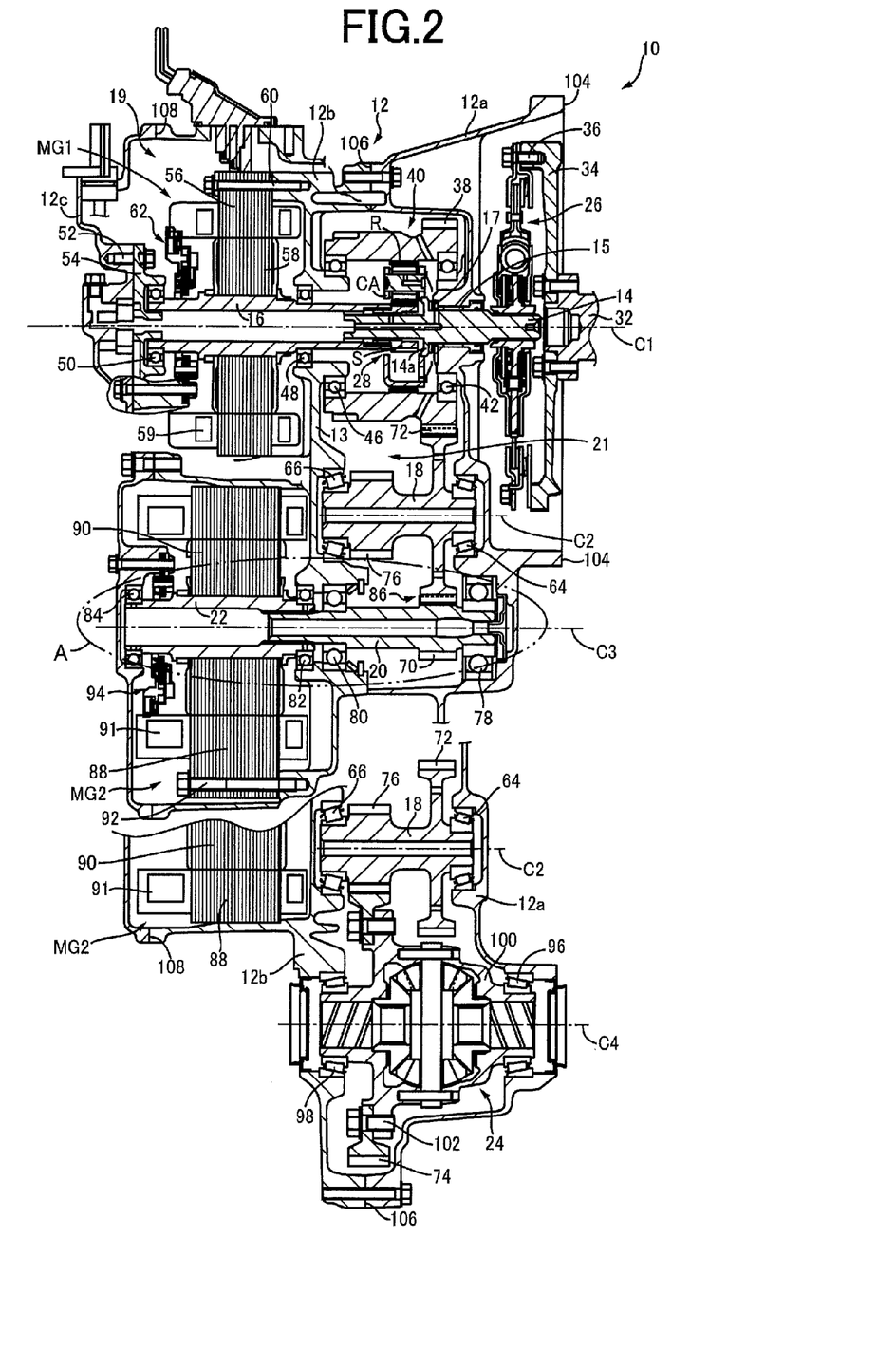
FIG. 2 is a cross-sectional view for explaining a structure of a drive device for a hybrid vehicle included in the hybrid vehicle of FIG. 1.

FIG. 1 is a skeleton diagram for explaining a structure of a hybrid vehicle 6 (hereinafter referred to as a vehicle 6) to which the present invention is applied. FIG. 2 is a cross-sectional view for explaining a structure of a vehicle power transmission device 10 making up a hybrid vehicle drive device 7 (hereinafter referred to as a drive device 7) included in the vehicle 6. The drive device 7 includes an engine 8 such as known gasoline and diesel engines acting as a running drive force source (power source), and the vehicle power transmission device 10 (hereinafter referred to as a power transmission device 10) transmitting power of the engine 8 to drive wheels 9. As depicted in FIG. 2, the power transmission device 10 includes four rotation axes (C1 to C4) parallel to each other in a casing 12 (corresponding to a case of the present invention) that is a casing body of the power transmission device 10. The first axis C1 is coincident with a rotation axis of the engine 8 and, on the first axis C1, an input shaft 14, a power distribution mechanism 28, and a first rotor shaft 16 of a first electric motor MG1 are rotatably supported. On the second axis C2, a counter shaft 18 is rotatably disposed. On the third axis C3, a power transmission shaft 20 and a second rotor shaft 22 of a second electric motor MG2 are rotatably supported. On the fourth axis C4, a differential gear device, i.e., a differential gear 24 is rotatably supported. The second electric motor MG2 corresponds to an electric motor of the present invention.

The casing 12 is a non-rotating member made up of three case members, which are a housing 12a, a case 12b, and a cover 12c, and the case members are fastened at axial end surfaces (mating surfaces) by bolts to make up the one casing 12. The case 12b is a portion of the casing 12 and has a partition wall 13 extending from a cylindrical outer wall thereof toward inside of the casing 12 and substantially perpendicular to the rotation axes. Since the partition wall 13 is formed, a motor chamber 19 is formed that houses the first electric motor MG1 and the second electric motor MG2 in the casing 12. On the opposite side of the motor chamber 19 across the partition wall 13 in the casing 12, a gear chamber 21 is formed that houses the power distribution mechanism 28, the counter shaft 18, the power transmission shaft 20, the differential gear 24, etc. As described above, the partition wall 13 acts as a wall separating the motor chamber 19 and the gear chamber 21. The partition wall 13 corresponds to an inner wall of the present invention.

The input shaft 14 is rotatably supported around the axis C1 via a needle roller bearing 15 and a thrust bearing 17 by the housing 12a making up the casing 12.

A damper device 26 and the power distribution mechanism 28 consisting of a planetary gear device are disposed on an outer circumferential side of the input shaft 14. The damper device 26 has a function of absorbing torque variation transmitted from the engine 8 and is provided between the engine 8 and the input shaft 14 in a power transmittable manner. The damper device 26 has an outer circumferential portion fastened by a bolt 36 to a disk-shaped flywheel 34 coupled to a crankshaft 32 of the engine 8 and an inner circumferential portion of the damper device 26 is spline-fitted to one axial end of the input shaft 14.

The power distribution mechanism 28 is mainly made up of a sun gear S and a ring gear R rotatable around the first axis C1 and a carrier CA rotatably and revolvably supporting a pinion gear meshing therewith. The sun gear S is relatively non-rotatably coupled to the first rotor shaft 16 of the first electric motor MG1 by spline fitting and the carrier CA is relatively non-rotatably connected to a flange portion 14a radially extending from the input shaft 14. The ring gear R is integrally formed in an inner circumferential portion of a composite gear shaft 40 provided with a counter drive gear 38 described later. Therefore, rotation of the ring gear R is transmitted to the counter drive gear 38.

The composite gear shaft 40 is rotatably supported via a first bearing 42 and a second bearing 46 by the casing 12. Specifically, the first bearing 42 is disposed on an inner circumferential end portion of the composite gear shaft 40 closer to the damper device 26 in the axial direction, and one axial end of the composite gear shaft 40 is rotatably supported via the first bearing 42 by the housing 12a (casing 12). The second bearing 46 is disposed on an inner circumferential end portion of the composite gear shaft 40 closer to the first electric motor MG1 in the axial direction, and the other axial end of the composite gear shaft 40 is rotatably supported via the second bearing 46 by the partition wall 13 (casing 12) formed on the case 12b.

The first rotor shaft 16 is rotatably supported via a third bearing 48 and a fourth bearing 50 by the casing 12. Specifically, the third bearing 48 is disposed on an outer circumferential portion of the first rotor shaft 16 near an intermediate portion in the axial direction, and one axial end of the first rotor shaft 16 is rotatably supported via the third bearing 48 by the partition wall 13 of the case 12b (casing 12). The fourth bearing 50 is disposed on an outer circumferential end portion of the first rotor shaft 16 closer to the cover 12c in the axial direction, and the other axial end of the first rotor shaft 16 is rotatably supported via the fourth bearing 50 by a cover member 54 (casing 12) fixed to the cover 12c by a bolt 52.

The first electric motor MG1 is disposed on an outer circumferential side of the first rotor shaft 16. The first electric motor MG1 mainly includes a stator 56, a rotor 58, and a coil end 59. The first electric motor MG1 is a so-called motor generator having a motor function and an electric generation function. The stator 56 of the first electric motor MG1 is non-rotatably fixed by a bolt 60 to the casing 12 (case 12b). An inner circumferential portion of the rotor 58 is relatively non-rotatably fixed to the first rotor shaft 16. Therefore, rotation of the first electric motor MG1 is transmitted to the first rotor shaft 16. A resolver 62 is disposed for detecting the rotation speed of the first rotor shaft 16, i.e., the rotation speed of the first electric motor MG1.

To the counter shaft 18 disposed on the second axis C2, the power from the engine 8 is transmitted via the damper device 26, the power distribution mechanism 28, and the counter drive gear 38. The counter shaft 18 is rotatably supported via a fifth bearing 64 and a sixth bearing 66 by the casing 12. Specifically, the fifth bearing 64 is disposed on an outer circumferential end portion of the counter shaft 18 closer to the housing 12a in the axial direction, and one axial side of the counter shaft 18 is rotatably supported via the fifth bearing 64 by the housing 12a (casing 12). The sixth bearing 66 is disposed on an outer circumferential end portion of the counter shaft 18 closer to the case 12b in the axial direction, and the other axial side of the counter shaft 18 is rotatably supported via the sixth bearing 66 by the partition wall 13 of the case 12b (casing 12). The counter shaft 18 corresponds to a second rotating member of the present invention.

A counter driven gear 72 is formed on the counter shaft 18 on the housing 12a side in the axial direction and meshes with each of the counter drive gear 38 formed on the composite gear shaft 40 and a reduction gear 70 described later. A differential drive gear 76 is formed on the counter shaft 18 on the cover 12c side in the axial direction and meshes with a differential ring gear 74 described later. The counter drive gear 38, the reduction gear 70, the counter driven gear 72 meshing with the counter drive gear 38 and the reduction gear 70, the differential ring gear 74, and the differential drive gear 76 meshing therewith are all made up of helical gears. The reduction gear 70 corresponds to a first gear of the present invention and the counter driven gear 72 corresponds to a second gear of the present invention.

The power transmission shaft 20 disposed on the third axis C3 is coupled to the second electric motor MG2 and is rotatably supported via a seventh bearing 78 and an eighth bearing 80 by the casing 12. Specifically, the seventh bearing 78 is disposed on an outer circumferential end portion of the power transmission shaft 20 closer to the housing 12a in the axial direction, and one axial end of the power transmission shaft 20 is rotatably supported via the seventh bearing 78 by the housing 12a (casing 12). The eighth bearing 80 is disposed on an outer circumferential end portion of the power transmission shaft 20 closer to the cover 12c in the axial direction, and the other axial end of the power transmission shaft 20 is rotatably supported via the eighth bearing 80 by the partition wall 13 of the case 12b (casing). The power transmission shaft 20 corresponds to a first rotating member of the present invention.

The reduction gear 70 meshing with the counter driven gear 72 is formed on the power transmission shaft 20. An end portion of the power transmission shaft 20 closer to the eighth bearing 80 in the axial direction is non-rotatably spline-fitted to the second rotor shaft 22. The second rotor shaft 22 is rotatably supported via a ninth bearing 82 and a tenth bearing 84 by the casing 12. Specifically, the ninth bearing 82 is disposed on an outer circumferential end portion of the second rotor shaft 22 closer to the power transmission shaft 20 in the axial direction, and one axial end of the second rotor shaft 22 is rotatably supported via the ninth bearing 82 by the partition wall 13 of the case 12b (casing 12). The tenth bearing 84 is disposed on an outer circumferential end portion of the second rotor shaft 22 closer to the cover 12c in the axial direction, and the other axial end of the second rotor shaft 22 is rotatably supported via the tenth bearing 84 by the cover 12c. The counter driven gear 72 formed on the counter shaft 18 and the reduction gear 70 formed on the power transmission shaft 20 are meshed with each other to make up a gear pair 86 coupling the power transmission shaft 20 and the counter shaft 18 in a power transmittable manner.

The second electric motor MG2 acting as a power source is disposed on an outer circumferential side of the second rotor shaft 22. The second electric motor MG2 mainly includes a stator 88, a rotor 90, and a coil end 91. The second electric motor MG2 is a so-called motor generator having a motor function and an electric generation function as is the case with the first electric motor MG1. The stator 88 of the second electric motor MG2 is non-rotatably fixed by a bolt 92 to the case 12b (casing 12). An inner circumferential portion of the rotor 90 is relatively non-rotatably fixed to the second rotor shaft 22. Therefore, rotation of the second electric motor MG2 is transmitted to the second rotor shaft 22. Since the second rotor shaft 22 is spline-fitted to the power transmission shaft 20, rotation of the second rotor shaft 22 is transmitted to the reduction gear 70. A resolver 94 is disposed for detecting the rotation speed of the second rotor shaft 22, i.e., the rotation speed of the second electric motor MG2. The second electric motor MG2 has the rotor 90 disposed radially outside the second rotor shaft 22 and the weight of the rotor 90 is extremely larger as compared to the power transmission shaft 20. Therefore, the rotor 90 has the moment of inertia around the third axis C3 extremely larger than the power transmission shaft 20. The rotor 90 and the second rotor shaft 22 integrally rotating obviously have the combined moment of inertia around the third axis C3 extremely larger than the power transmission shaft 20.

The differential gear 24 disposed on the fourth axis C4 and acting as a differential device (final reduction gear) is rotatably supported via an eleventh bearing 96 and a twelfth bearing 98 by the casing 12. Specifically, one axial outer circumferential end of a differential case 100 making up the differential gear 24 is rotatably supported via the eleventh bearing 96 by the housing 12a (casing 12), and the other axial outer circumferential end of the differential case 100 is rotatably supported via the twelfth bearing 98 by the case 12b (casing 12). The differential ring gear 74 meshing with the differential drive gear 76 is fixed by a bolt 102 to outer circumference of the differential case 100. A specific configuration and operation of the differential gear 24 is known and will not be described.

Figure 3:
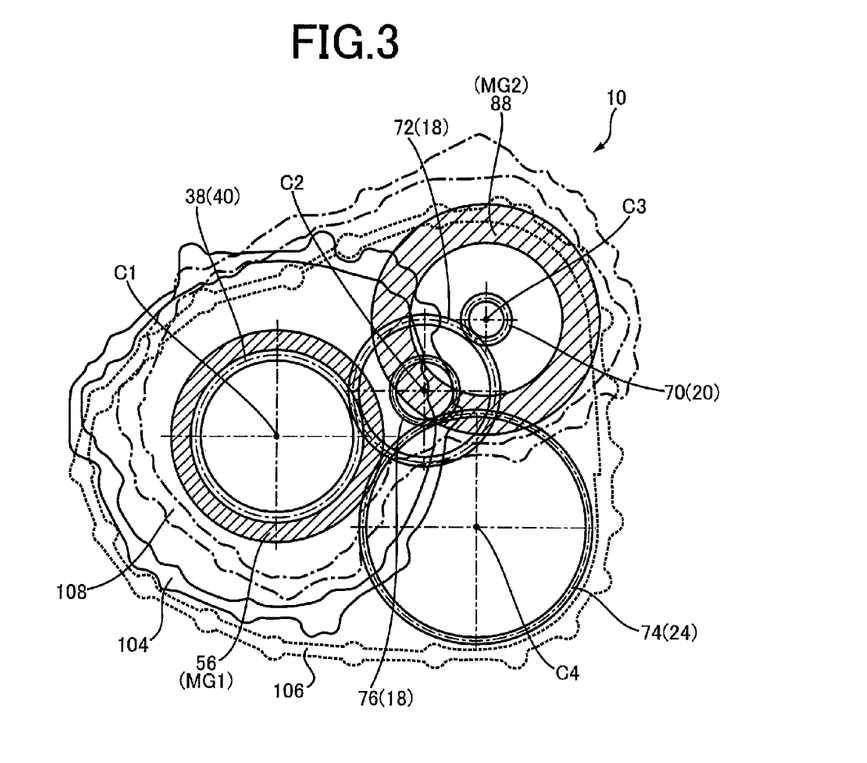
FIG. 3 corresponds to a diagram when the drive device for a vehicle of FIG. 2 is viewed from the direction parallel to axes, and a simplified diagram of arrangement positions of a counter shaft, a power transmission shaft, a differential gear, a composite gear shaft, a first electric motor, and a second electric motor and arrangement positions of the axes.

The differential gear 24 meshing with the differential drive gear 76 is depicted as a separate view because the first to fourth axes C1 to C4 are actually not arranged on one plane. Specifically, the axes C1 to C4 are arranged as depicted in FIG. 3. FIG. 3 is a simplified diagram of arrangement positions of the counter shaft 18, the power transmission shaft 20, the differential gear 24, the composite gear shaft 40, the first electric motor MG1, and the second electric motor MG2 and arrangement positions of the axes C1 to C4, corresponding to a diagram when the power transmission device 10 of FIG. 2 is viewed from the direction parallel to the axes. In FIG. 3, an upper side corresponds to a vertically upper side of the vehicle 6. In FIG. 3, a mating surface 104 between the housing 12a depicted in FIG. 2 and an engine case not depicted corresponds to a part surrounded by a solid line. A mating surface 106 between the housing 12a and the case 12b depicted in FIG. 2 corresponds to a part surrounded by a broken line. A mating surface 108 between the case 12b and the cover 12c corresponds to a part surrounded by a dashed-dotted line.

As depicted in FIG. 3, the third axis C3 acting as a rotation axis of the second electric motor MG2 and the power transmission shaft 20 is located vertically uppermost and the fourth axis C4 acting as a rotation axis of the differential gear 24 is located vertically lowermost. The second axis C2 acting as a rotation axis of the counter shaft 18 is positioned in an area surrounded by the first axis C1, the third axis C3, and the fourth axis C4. Both the counter drive gear 38 and the reduction gear 70 are meshed with the counter driven gear 72, and the differential drive gear 76 and the differential ring gear 74 are meshed with each other. The gears of this example are all implemented by using helical gears.

In the drive device 7 configured as described above, the power of the engine 8 is input via the damper device 26 to the input shaft 14 and is transmitted from the input shaft 14 sequentially through the power distribution mechanism 28, the counter drive gear 38, the counter driven gear 72, the counter shaft 18, the differential drive gear 76, the differential gear 24, a pair of axles, etc., to a pair of the drive wheels 9. Therefore, the input shaft 14, the power distribution mechanism 28, the counter drive gear 38, the counter driven gear 72, the counter shaft 18, the differential drive gear 76, and the differential gear 24 make up an engine power transmission path that is a power transmission path from the engine 8 to the drive wheels 9. The power distribution mechanism 28 has a differential state controlled by the first electric motor MG1 coupled to the sun gear S, thereby acting as an electric continuously variable transmission. Torque of the second electric motor MG2, i.e., power of the second electric motor MG2, is supplied via the power transmission shaft 20 and the reduction gear 70 to the counter driven gear 72 making up a portion of the engine power transmission path. Therefore, the power of the second electric motor MG2 is transmitted from the second rotor shaft 22 sequentially through the power transmission shaft 20, the reduction gear 70, the counter driven gear 72, the counter shaft 18, the differential drive gear 76, the differential gear 24, a pair of the axles, etc., to a pair of the drive wheels 9.

Figure 4:
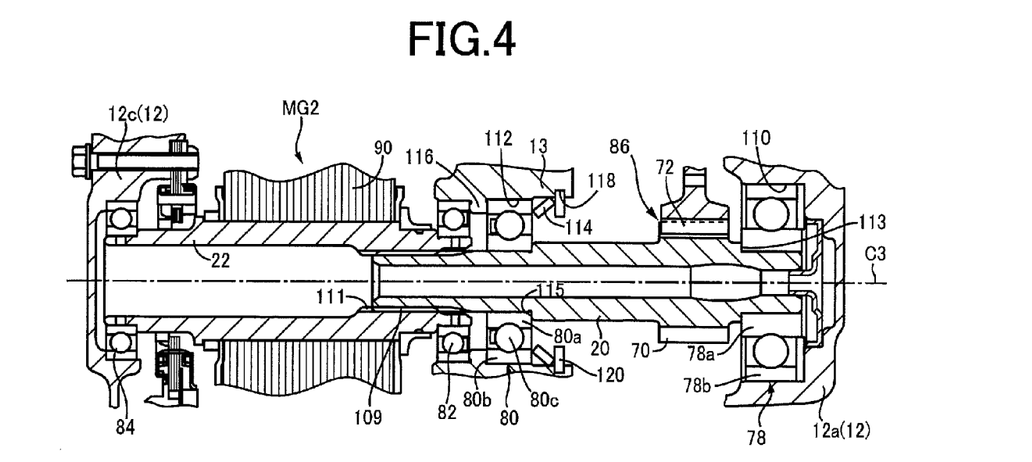
FIG. 4 is a partially enlarged cross-sectional view of a portion A indicated by a dashed-dotted line near the third axis C3 of FIG. 2.

FIG. 4 is a partially enlarged cross-sectional view of a portion A surrounded by a dashed-dotted line near the third axis C3 of FIG. 2. As depicted in FIG. 4, the rotor shaft 22 of the second electric motor MG2 has a cylindrical shape and is rotatably supported via the ninth bearing 82 and the tenth bearing 84 disposed on the both outer circumferential end portions thereof by the casing 12. The power transmission shaft 20 has a cylindrical shape and is rotatably supported via the seventh bearing 78 and the eighth bearing 80 by the casing 12. The power transmission shaft 20 and the rotor shaft 22 are relatively non-rotatably coupled by spline fitting. Specifically, spline outer circumferential teeth 109 are formed on an outer circumferential surface of the power transmission shaft 20 on the tenth bearing 84 side in the axial direction while spline inner circumferential teeth 111 are formed on an inner circumferential surface of the rotor shaft 22 on the seventh bearing 78 side in the axial direction, and these teeth are relatively non-rotatably fitted to each other.

The seventh bearing 78 and the eighth bearing 80 rotatably supporting the power transmission shaft 20 have respective inner rings fitted and attached to the power transmission shaft 20 by press fitting and outer rings axially movably (slidably) fitted and attached to the casing 12. For example, describing the seventh bearing 78, an inner ring 78a of the seventh bearing 78 is fitted and attached by press fitting at a position abutting on a stopper wall 113 perpendicular to the axis C3 formed on the power transmission shaft 20. Therefore, the inner ring 78a is fixed relatively non-rotatably and relatively unmovably in the axial direction to the power transmission shaft 20. On the other hand, an outer ring 78b of the seventh bearing 78 is fitted and attached to an annular hole 110 formed in the housing 12a (casing 12) and is allowed to move (slide) in the axial direction relative to the annular hole 110. The seventh bearing 78 corresponds to an outer-wall bearing of the present invention.

The eighth bearing 80 has an inner ring 80a fitted and attached by press fitting at a position abutting on a stopper wall 115 perpendicular to the axis C3 formed on the power transmission shaft 20. Therefore, the inner ring 80a is fixed relatively non-rotatably and relatively unmovably in the axial direction to the power transmission shaft 20. On the other hand, an outer ring 80b of the eighth bearing 80 is fitted and attached to a through-hole 112 formed in the partition wall 13 (the case 12b, the casing 12) for allowing penetration of the power transmission shaft 20 such that the outer ring 80b is allowed to move (slide) in the axial direction. The eighth bearing 80, the inner ring 80a, and the outer ring 80b correspond to an inner-wall bearing of the present invention, an inner ring of the inner-wall bearing of the present invention, and an outer ring of the inner-wall bearing of the present invention, respectively.

The outer ring 80b is always biased by a disk spring 114 that is an elastic member toward the tenth bearing 84 in the axial direction. The partition wall 13 is provided with an annular wall 116 in an annular shape extending from an inner circumferential surface of the through-hole 112 to an inner circumferential side, and one axial end of the outer ring 80b abuts on a side surface of the annular wall 116 so that movement in one axial direction is limited. An annular groove 118 is formed in the inner circumferential surface of the through-hole 112 and a snap ring 120 is axially unmovably fitted and attached to the annular groove 118. The disk spring 114 (elastic member) is provided in a preloaded state between the other axial end of the outer ring 80b and the snap ring 120. Therefore, the outer ring 80b is always biased (pressed) by a bias force of the disk spring 114 toward the annular wall 116 formed on the partition wall 13. Since the inner ring 80a is fixed to the power transmission shaft 20 by press fitting, when the outer ring 80b is biased, the power transmission shaft 20 is also pressed against the annular wall 116, i.e., the partition wall 13, via balls 80c and the inner ring 80a of the eighth bearing 80. In other words, the disk spring 114 is provided in a preloaded state between the eighth bearing 80 axially unmovably fixed to the power transmission shaft 20 and the snap ring 120 integrally fixed to the inner wall 13 and the disk spring 114 presses the power transmission shaft 20 toward the partition wall 13. The disk spring 114 corresponds to an elastic member of the present invention and the annular wall 116 corresponds to a side wall of the present invention.

During running while the engine 8 is operating, i.e., while the engine power transmission path from the engine 8 to the drive wheels 9 is in a power transmission state, if the torque of the second electric motor MG2 becomes zero or substantially zero in the drive device 7, no power is transmitted to the power transmission shaft 20, resulting in a floating state. In this case, if rotation variation due to explosion variation of the engine 8 is transmitted via the damper device 26, the power distribution mechanism 28, and the counter drive gear 38 to the counter driven gear 72, the rotation variation is also transmitted to the reduction gear 70 meshed with the counter driven gear 72, and the power transmission shaft 20 provided with the reduction gear 70 fluctuates in the rotation direction and the axial direction (thrust direction), generating rattling noise attributable to collision of the power transmission shaft 20 with the casing 12. Particularly, while the torque of the second electric motor MG2 is zero or substantially zero, since the second electric motor MG2 is in a power transmission interrupting state, the rotor 90 of the second electric motor MG2 having a large inertial mass no longer contributes as the inertia (inertial mass) of a power transmission system, and the inertia becomes smaller also in the entire power transmission system. Therefore, the rotation variation of the engine 8 is more easily transmitted to the reduction gear 70. The power transmission shaft 20 fluctuates in the thrust direction because the reduction gear 70 and the counter driven gear 72 are made up of helical gears and the meshing of these gears generates a component force acting in the thrust direction.

Since the power transmission shaft 20 is biased by the disk spring 114 via the eighth bearing 80 to the partition wall 13 in this example, even if the power transmission shaft 20 vibrates in the thrust direction due to the rotation variation of the engine 8 while the torque of the second electric motor MG2 is zero or substantially zero, the power transmission shaft 20 collides only with the partition wall 13. Therefore, when the power transmission shaft 20 vibrates in the thrust direction, the power transmission shaft 20 collides with the partition wall 13, and impact force due to the collision is input only to the partition wall 13 and is not input to the housing 12a also acting as an outer wall of the casing 12. Thus, this reduces the vibration of the housing 12a also acting as the outer wall due to the collision with the power transmission shaft 20 and also reduces rattling noise generated by vibration of a wall surface thereof.

Figure 5:
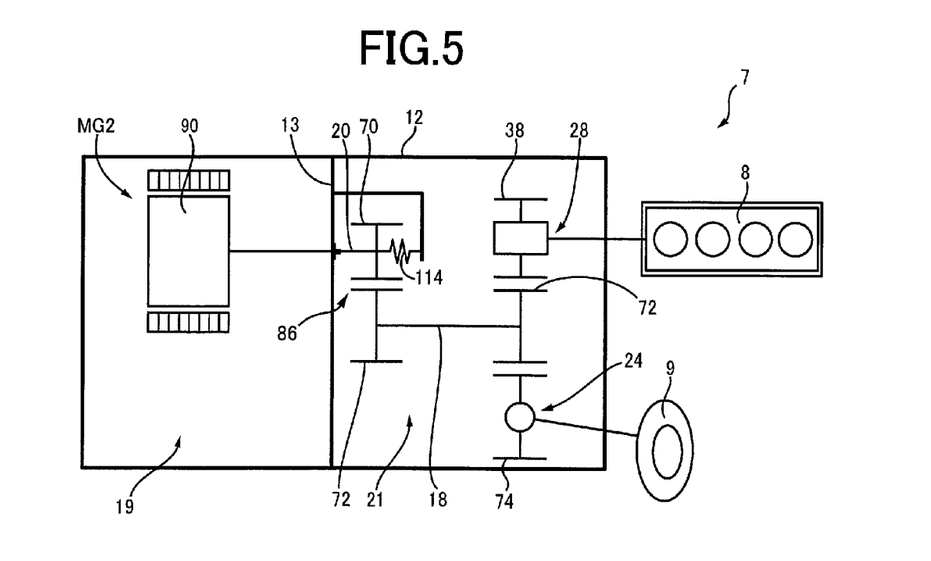
FIG. 5 is a schematic of a configuration of the drive device for a vehicle of FIG. 2.

FIG. 5 is a schematic of a configuration of the drive device 7 of FIG. 2. Although two counter driven gears 72 are depicted in FIG. 5, this is because the reduction gear 70 and the counter drive gear 38 are arranged at positions shifted in the axial direction so as to clarify that the counter driven gear 72 is meshed with each of the reduction gear 70 and the counter drive gear 38 and, therefore, the counter driven gears 72 are separately depicted as the gears 72 meshed therewith only for convenience and, in fact, as depicted in FIG. 2, the reduction gear 70 and the counter drive gear 38 are arranged at the same positions in the axial direction, i.e., at overlapping positions in the radial direction and the one counter driven gear 72 is present. In FIG. 5, the differential drive gear 76 is not depicted.

As can be seen from FIG. 5, the reduction gear 70 and the power transmission shaft 20 coupled thereto are always pressed against the partition wall 13 by the elastic member (disk spring 114). Therefore, while the torque of the second electric motor MG2 is zero or substantially zero, if the reduction gear 70 and the power transmission shaft 20 vibrate in the thrust direction due to the rotation variation of the engine 8, since the reduction gear 70 and the power transmission shaft 20 are pressed against the partition wall 13 by the disk spring 114, the power transmission shaft 20 collides only with the partition wall 13. As a result, the impact force due to the collision is not input to the outer wall of the casing 12 (e.g., the housing 12a) and, therefore, the rattling noise is reduced that is generated by the vibration of the outer wall of the casing 12.

Returning to FIG. 4, the drive device 7 of this example is configured such that when the torque of the second electric motor MG2 becomes equal to or greater than a predetermined value, the torque is transmitted to the power transmission shaft 20 and causes the housing 12a acting as the outer wall to receive a gear reaction force in the thrust direction generated between the reduction gear 70 formed on the power transmission shaft 20 and the counter driven gear 72 meshed therewith. For example, outer circumferential teeth of the counter driven gear 72 and the reduction gear 70 are formed such that when the second electric motor MG2 outputs a positive torque (torque in the forward rotation direction), a thrust force F generated between the counter driven gear 72 and the reduction gear 70 acts toward the seventh bearing 78 in the axial direction. The outer circumferential teeth are configured such that when the torque of the second electric motor MG2 becomes equal to or greater than the predetermined value, the power transmission shaft 20 is pressed toward the seventh bearing 78 by the thrust force F acting on the power transmission shaft 20 against the bias force of the disk spring 114. The predetermined value of the torque of the second electric motor is preliminarily obtained and is set to a threshold value of a torque region in which rattling becomes problematic, for example. In this example, the rattling noise is considered problematic that is generated in the torque region when the torque of the second electric motor MG2 is zero or substantially zero and, therefore, the predetermined value is substantially zero. The rigidity of the disk spring 114 and axial gaps formed between the components are set such that when the torque of the second electric motor becomes equal to or greater than the predetermined value (e.g., during high-load running), the power transmission shaft 20 is biased toward the housing 12a against the bias force of the disk spring 114 by the gear reaction force (thrust force F) between the reduction gear 70 and the counter driven gear 72. The gear reaction force in the thrust direction is generated because both the reduction gear 70 and the counter driven gear 72 are made up of helical gears.

As described above, according to this example, when the torque of the second electric motor MG2 becomes zero or close to zero, no torque may be transmitted to the power transmission shaft 20 and the reduction gear 70 formed thereon, and the power transmission shaft 20 and the reduction gear 70 may enter the floating state. In this case, when the rotation variation due to explosion variation of the engine 8 is transmitted to the power transmission shaft 20 and causes the power transmission shaft 20 to vibrate in the rotation direction and the thrust direction (axial direction), rattling occurs that is collision between the power transmission shaft 20 and the casing 12, and the impact force thereof vibrates a case surface of the casing 12 and generates the rattling noise. In this regard, since the disk spring 114 presses the power transmission shaft 20 toward the partition wall 13 in this configuration, the power transmission shaft 20 can be allowed to collide only with the partition wall 13 side even when the rattling occurs. Therefore, because the impact force due to the rattling is not input to the outer wall side of the casing 12 (such as the housing 12a), the rattling noise is reduced that is generated by the vibration of the outer wall surface of the casing 12. The present invention changes an impact point (input point) due to the rattling to reduce the rattling noise itself rather than changing control by the second electric motor MG2 or an operation point of the engine 8 to suppress the rattling as in the conventional case and therefore also prevents a running shock generated in exchange for controlling the second electric motor MG2 and deterioration in fuel efficiency due to a change in the operation point of the engine 8.

According to this example, the gear pair is made up of the reduction gear 70 formed on the power transmission shaft 20 and the counter driven gear 72 formed on the counter shaft 18 and meshed with the reduction gear 70, and the power transmission shaft 20 is configured such that when the second electric motor MG2 outputs the torque equal to or greater than the predetermined value set in advance, the power transmission shaft 20 is biased toward the housing 12a acting as a portion of the outer wall by the thrust force F acting on the power transmission shaft 20 against the bias force of the disk spring 114. As a result, the power transmission shaft 20 is allowed to collide with the partition wall 13 in the torque region of the second electric motor MG2 in which rattling occurs in the power transmission shaft 20 and, when a greater torque is transmitted by the second electric motor MG2, the gear reaction force in the thrust direction can be received by the housing 12a acting as a portion of the outer wall, thereby allowing the partition wall 13 and the housing 12a of the casing 12 to receive support load of the power transmission shaft 20. Therefore, since support load applied toward the partition wall 13 is reduced, deterioration in durability can be suppressed in the eighth bearing 80 disposed on the partition wall 13 and supporting the power transmission shaft 20.

According to this example, the partition wall 13 is a wall separating the motor chamber 19 housing the second electric motor MG2 and the gear chamber 21 housing the power transmission shaft 20 and the counter shaft 18 in the casing 12, and the power transmission shaft 20 is rotatably supported via the eighth bearing 80 by the partition wall 13 with the inner ring 80a of the eighth bearing 80 press-fitted into the power transmission shaft 20 and the outer ring 80b of the eighth bearing 80 pressed by the disk spring 114 against the annular wall 116 formed on the partition wall 13. As a result, since the outer ring 80b of the eighth bearing 80 is pressed by the disk spring 114 against the annular wall 116, the power transmission shaft 20 is pressed against the partition wall 13 via the eighth bearing 80.

Another example of the present invention will be described. In the following description, the portions common with the example are denoted by the same reference numerals and will not be described.

SECOND EXAMPLE

Figure 6:
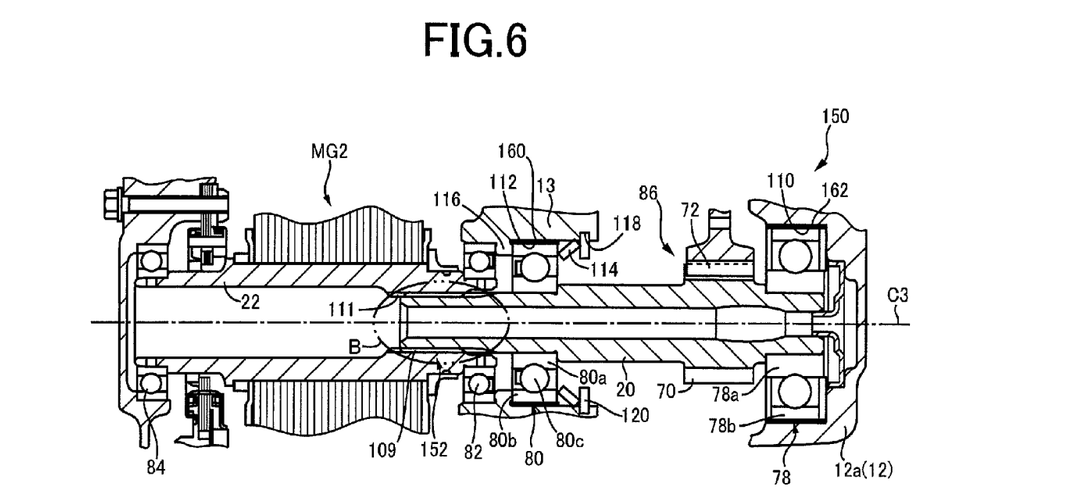
FIG. 6 is a partially enlarged cross-sectional view of a portion around the second electric motor and the power transmission shaft in the drive device for a hybrid vehicle that is another example of the present invention.

FIG. 6 is a partially enlarged cross-sectional view of a portion around the second electric motor MG2 and the power transmission shaft 20 in a hybrid vehicle drive device 150 (hereinafter referred to as a drive device 150) that is another example of the present invention, corresponding to FIG. 4 of the example. Comparing FIG. 6 with FIG. 4 of the example, friction materials acting as damping elements (friction mechanisms, hysteresis mechanisms) are added to a spline fitting portion 152 coupling the power transmission shaft 20 and the rotor shaft 22 indicated by a dashed-two dotted line B, a gap between the eighth bearing 80 and the partition wall 13, and a gap between the seventh bearing 78 and the housing 12a (casing 12) in this example. The other constituent elements are the same as the example and therefore will not be described. Specific structures of the friction materials disposed on the respective parts will hereinafter be described.

Figure 7:
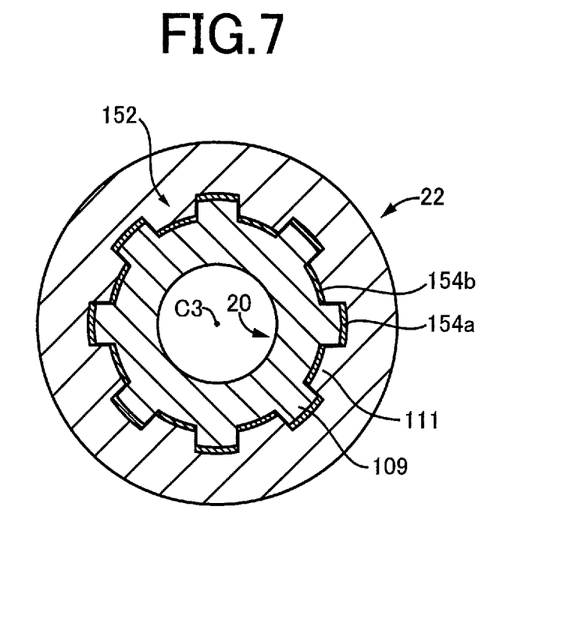
FIG. 7 is a diagram of a spline fitting portion of FIG. 6 viewed in the axial direction.

In the spline fitting portion 152 between the rotor shaft 22 of the second electric motor MG2 and the power transmission shaft 20 surrounded by the dashed-two dotted line B of FIG. 6, a friction material 154 acting as a damping element suppressing resonance due to the disk spring 114 is formed in a gap formed between respective spline teeth. FIG. 7 is a diagram of the spline fitting portion 152 viewed in the axial direction. As depicted in FIG. 7, the friction material 154 corresponding to a damping element of the present invention is interposed in a gap formed between the spline outer circumferential teeth 109 formed on the power transmission shaft 20 side and the spline inner circumferential teeth 111 formed on the rotor shaft 22 side. Specifically, a plurality of friction materials 154a are interposed in gaps between tooth top surfaces of the spline outer circumferential teeth 109 and tooth bottom surfaces of the spline inner circumferential teeth 111. A plurality of friction materials 154b are interposed in gaps between tooth bottom surfaces of the spline outer circumferential teeth 109 and tooth top surfaces of the spline inner circumferential teeth 111. The friction materials 154a, 154b are affixed to either the spline outer circumferential teeth 109 or the spline inner circumferential teeth 111, for example. Therefore, when the power transmission shaft 20 and the rotor shaft 22 slide (relatively move) in the axial direction (thrust direction), a friction force is generated between the friction materials 154a, 154b and parts sliding thereon (the spline outer circumferential teeth 109 or the spline inner circumferential teeth 111).

Returning to FIG. 6, a friction material 160 formed into a cylindrical shape and acting as a damping element suppressing resonance due to the disk spring 114 is provided between an outer circumferential surface of the outer ring 80b of the eighth bearing 80 and the through-hole 112 of the partition wall 13. The friction material 160 is affixed to either the outer circumferential surface of the outer ring 80b or the inner circumferential surface of the through-hole 112 of the partition wall 13, for example. Therefore, when the power transmission shaft 20 fluctuates in the axial direction (thrust direction), a friction force is generated between the friction material 160 and the outer ring 80b or the through-hole 112 sliding thereon.

A friction material 162 formed into a cylindrical shape and acting as a damping element suppressing resonance due to the disk spring 114 is provided between an outer circumferential surface of the outer ring 78b of the seventh bearing 78 and the annular hole 110 formed on the housing 12a (casing 12). The friction material 162 is affixed to either the outer circumferential surface of the outer ring 78b or an inner circumferential surface of the annular hole 110, for example. Therefore, when the power transmission shaft 20 fluctuates in the axial direction (thrust direction), a friction force is generated between the friction material 162 and the outer ring 78b or the annular hole 110 sliding thereon.

The friction materials 154, 160, 162 (hereinafter referred to as the friction material if not particularly distinguished) act as the damping elements. Specifically, as described above, the power transmission shaft 20 is biased by the disk spring 114 acting as an elastic member toward the partition wall 13. If such an elastic member is disposed, a resonance system is generally formed. Therefore, resonance occurs at the resonance frequency of this resonance system. In this regard, since the friction material is disposed that generates a friction force when the power transmission shaft 20 fluctuates in the thrust direction, the friction material acts as a hysteresis mechanism (friction mechanism) suppressing the resonance and, therefore, vibration of the resonance system can be suppressed. The friction coefficients etc. of the friction material are appropriately adjusted such that the vibration of the resonance system is suppressed.

The friction material acting as the damping element is desirably disposed on parts not generating differential rotation between the parts supporting the friction material. This is because if the friction material is disposed on parts generating differential rotation, drag is always generated therebetween and deteriorates fuel efficiency. For example, the power transmission shaft 20 and the rotor shaft 22 are spline-fitted and therefore are parts that are relatively non-rotatable, i.e., that generate no differential rotation. The outer ring 80b of the eighth bearing 80 and the partition wall 13 supporting the friction material 160 are not relatively rotatable and therefore generate no differential rotation. Similarly, the outer ring 78b of the seventh bearing 78 and the housing 12a supporting the friction material 162 are not relatively rotatable and therefore generate no differential rotation. Thus, when the friction material is disposed on these parts, the resonant vibration is suppressed and the deterioration in fuel efficiency is prevented.

Figure 8:
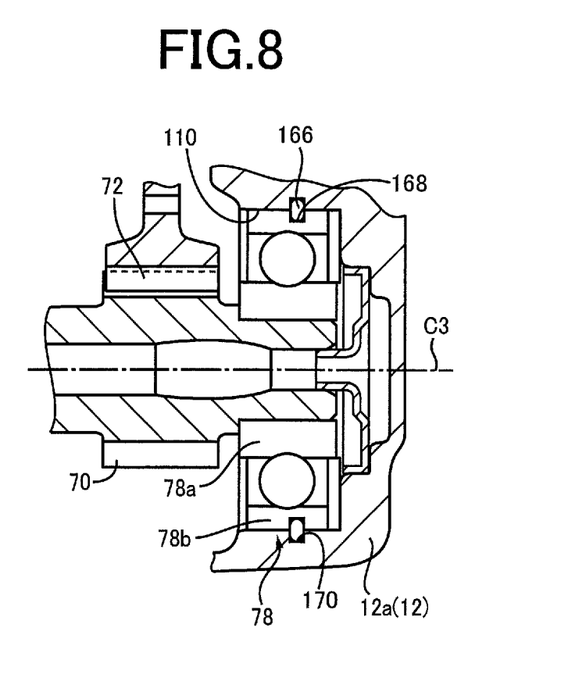
FIG. 8 is a diagram for indicating an alternative mechanism of a damping element of FIG. 6.

A damping element depicted in FIG. 8 may be disposed instead of the friction materials 160, 162 disposed on the seventh bearing 78 and the eighth bearing 80. FIG. 8 depicts a configuration with a ring 166 acting as the damping element disposed on the seventh bearing 78. As depicted in FIG. 8, an annular groove 168 in an annular shape is formed in the outer ring 78b of the seventh bearing 78. An annular groove 170 in an annular shape is formed in the inner circumferential surface of the annular hole 110 at the same position as the annular groove 168 in the axial direction, i.e., at a position overlapping with the annular groove 168 in the radial direction. The annular ring 166 consisting of an elastic member is fitted and attached into an annular space formed by the annular grooves 168, 170. The ring 166 has the center of a cross section thereof set substantially equal to a position of mating surfaces between the outer circumferential surface of the outer ring 78b and the annular hole 110 of the housing 12a in the radial direction. Therefore, if the power transmission shaft 20 fluctuates in the axial direction (thrust direction), the fluctuation is damped by an elastic returning force of the ring 166. As a result, since the ring 166 acts as the damping element, the same effect as the friction material 162 can be acquired also in the structure depicted in FIG. 8. The same configuration can be achieved not only in the seventh bearing 78 but also in the eighth bearing 80.

As described above, since the disk spring 114 acting as the elastic member is disposed in this example, the same effect as the example can be acquired. The rotor shaft 22 of the second electric motor MG2 and the power transmission shaft 20 are coupled by spline fitting and the friction material 154 suppressing the resonance due to the disk spring 114 is disposed in a gap formed in the spline fitting portion 152 between the rotor shaft 22 of the second electric motor MG2 and the power transmission shaft 20. As a result, although the resonance system is formed by disposing the disk spring 114, the friction material 154 can suppress the vibration of the resonance system.

According to this example, the friction material 160 suppressing the resonance due to the disk spring 114 is disposed between the partition wall 13 and the eighth bearing 80. As a result, although the resonance system is formed by disposing the disk spring 114, the friction material 160 can suppress the vibration of the resonance system.

According to this example, the power transmission shaft 20 is rotatably supported via the seventh bearing 78 by the outer wall (housing 12a) of the casing 12 and the friction material 162 suppressing the resonance due to the disk spring 114 is disposed between the housing 12a and the seventh bearing 78. As a result, although the resonance system is formed by disposing the disk spring 114, the friction material 162 can suppress the vibration of the resonance system.

Although the examples of the present invention have been described in detail with reference to the drawings, the present invention is applicable in other forms.

For example, although the snap ring 120 is disposed as a member supporting the disk spring 114 in the examples, the member is not necessarily limited to the snap ring 120 and may be changed as needed to, for example, a member fixed by welding.

Although the disk spring 114 is used as the elastic member in the examples, the elastic member is not necessarily limited to the disk spring 114 and the power transmission shaft 20 may be configured to be biased toward the partition wall 13 by using, for example, an elastic body such as rubber and resin.

Although the partition wall 13 is a wall forming the motor chamber 19 and the gear chamber 21 in the casing 12 in the examples, the inner wall is not necessarily limited thereto and may be formed in another part. The inner wall may not necessarily be a partition wall separating spaces and may be a structure only partially projecting from the outer wall of the casing 12 to an inner circumferential side.

Although the friction material 154, the friction material 160, and the friction material 162 are disposed on the drive device 150 in the example, these friction materials may not all be disposed on the parts and any configuration disposed with at least one of these friction materials may be available.

Although the spline fitting portion 152 has the friction materials 154a disposed between the tooth top surfaces of the spline outer circumferential teeth 109 and the tooth bottom surfaces of the spline inner circumferential teeth 111 and the friction materials 154b disposed between the tooth bottom surfaces of the spline outer circumferential teeth 109 and the tooth top surfaces of the spline inner circumferential teeth 111 in the example, a configuration disposed with either the friction materials 154a or the friction materials 154b may be available. The friction material 154 may not necessarily be disposed over the entire circumference and may be disposed in a circumferentially dispersed manner, for example.

Although the examples have the predetermined value of the second electric motor MG2 set to substantially zero by way of example, the predetermined value is not necessarily limited to such a low value and may be set to a larger value. In short, the predetermined value may appropriately be changed depending on a type of a vehicle etc.

The above description is merely an embodiment and the present invention may be implemented in variously modified and improved forms based on the knowledge of those skilled in the art.

NOMENCLATURE OF ELEMENTS

8: engine 12: casing (case) 12a: housing (outer wall) 13: partition wall (inner wall) 18: counter shaft (second rotating member) 19: motor chamber 20: power transmission shaft (first rotating member) 21: gear chamber 70: reduction gear (first gear) 72: counter driven gear (second gear) 78: seventh bearing (outer-wall bearing) 80: eighth bearing (inner-wall bearing) 80a: inner ring (inner ring of the inner-wall bearing) 80b: outer ring (outer ring of the inner-wall bearing) 86: gear pair 114: disk spring (elastic member) 116: annular wall (side wall) 152: spline fitting portion 154: friction material (damping element) 160: friction material (damping element) 162: friction material (damping element) 166: ring (damping element) MG2: second electric motor (electric motor)

The invention claimed is:

1. A drive device of a hybrid vehicle including an engine and an electric motor acting as power sources, the drive device comprising:
    a first rotating member coupled to the electric motor and disposed along a first rotation axis;
    a second rotating member to which power from the engine is transmitted and disposed along a second rotation axis different than the first rotation axis;
    a case that includes an inner wall extending from an outer wall of the case toward an inside of the case;
    an inner-wall bearing rotatably supporting the first rotating member is interposed between the first rotating member and the inner wall, an inner ring of the inner-wall bearing being press-fitted to the first rotating member and an outer ring of the inner-wall bearing being axially movably fitted and attached to the inner wall;
    an elastic member pressing the outer ring of the inner-wall bearing against a side wall formed on the inner wall; and
    a mechanism having a first gear made up of a helical gear formed on the first rotating member and a second gear made up of a helical gear formed on the second rotating member with the first gear and the second gear meshed with each other within the case.

2. The drive device of a hybrid vehicle of claim 1, wherein when the electric motor outputs a torque equal to or greater than a predetermined value set in advance, the first rotating member is biased toward a direction away from the inner wall of the case by a thrust force acting on the first rotating member against a bias force of the elastic member.

3. The drive device of a hybrid vehicle of claim 1, wherein the inner wall is a partition wall in the case separating a motor chamber housing the electric motor and a gear chamber housing the first rotating member and the second rotating member.

4. The drive device of a hybrid vehicle of claim 3, wherein a friction material suppressing resonance due to the elastic member is disposed between the inner wall and the inner-wall bearing.

5. The drive device of a hybrid vehicle of claim 1, wherein a rotor shaft of the electric motor and the first rotating member are coupled to each other by spline fitting, and wherein
a friction material suppressing resonance due to the elastic member is disposed in a gap formed in a spline fitting portion between the rotor shaft of the electric motor and the first rotating member.

6. The drive device of a hybrid vehicle of claim 3, wherein the first rotating member is further rotatably supported via an outer-wall bearing by the outer wall of the case, and wherein
a friction material suppressing resonance due to the elastic member is disposed between the outer wall and the outer-wall bearing.

* * * * *